United States Patent
Zhan et al.

(10) Patent No.: US 11,637,619 B2
(45) Date of Patent: Apr. 25, 2023

(54) RADIO FREQUENCY SIGNAL BOOSTERS SERVING AS OUTDOOR INFRASTRUCTURE IN HIGH FREQUENCY CELLULAR NETWORKS

(71) Applicant: Cellphone-Mate, Inc., Fremont, CA (US)

(72) Inventors: Hongtao Zhan, Fremont, CA (US); Scott Terry, Pleasanton, CA (US)

(73) Assignee: Cellphone-Mate, Inc., Fremont, CA (US)

( * ) Notice: Subject to any disclaimer, the term of this patent is extended or adjusted under 35 U.S.C. 154(b) by 0 days.

(21) Appl. No.: 17/577,907

(22) Filed: Jan. 18, 2022

(65) Prior Publication Data

US 2022/0247481 A1 Aug. 4, 2022

Related U.S. Application Data

(63) Continuation of application No. 16/946,057, filed on Jun. 4, 2020, now Pat. No. 11,265,075.
(Continued)

(51) Int. Cl.
*H04B 7/155* (2006.01)
*H04W 88/08* (2009.01)
(Continued)

(52) U.S. Cl.
CPC ..... *H04B 7/15535* (2013.01); *H04B 7/15507* (2013.01); *H04B 7/15542* (2013.01);
(Continued)

(58) Field of Classification Search
CPC ............ H04B 7/15535; H04B 7/15507; H04B 7/15542; H04B 7/2606; H04W 16/26; H04W 88/085
See application file for complete search history.

(56) References Cited

U.S. PATENT DOCUMENTS

| | | | |
|---|---|---|---|
| 4,972,346 A | 11/1990 | Kawano et al. | |
| 5,369,782 A | 11/1994 | Kawano et al. | |

(Continued)

FOREIGN PATENT DOCUMENTS

| | | |
|---|---|---|
| WO | WO 87/07439 A1 | 12/1987 |
| WO | WO 2006/059074 A2 | 6/2006 |

OTHER PUBLICATIONS

International Search Report and Written Opinion for International Application No. PCT/US2020/036090 dated Sep. 3, 2020 in 21 pages.
(Continued)

*Primary Examiner* — Keith Ferguson
(74) *Attorney, Agent, or Firm* — Knobbe, Martens, Olson & Bear, LLP

(57) ABSTRACT

Radio frequency signal boosters serving as outdoor cellular infrastructure are provided. In certain embodiments, a signal booster system for a high frequency cellular network includes a parabolic base station antenna configured to receive a downlink signal of a frequency band higher than 20 gigahertz and to transmit an amplified uplink signal of the frequency band, booster circuitry configured to amplify an uplink signal to generate the amplified uplink signal and to amplify the downlink signal to generate an amplified downlink signal, and a mobile station antenna configured to receive the uplink signal and to transmit the amplified downlink signal.

20 Claims, 11 Drawing Sheets

Related U.S. Application Data

(60) Provisional application No. 62/915,350, filed on Oct. 15, 2019, provisional application No. 62/858,622, filed on Jun. 7, 2019.

(51) Int. Cl.
  *H04B 7/26* (2006.01)
  *H04W 16/26* (2009.01)

(52) U.S. Cl.
  CPC .......... *H04B 7/2606* (2013.01); *H04W 16/26* (2013.01); *H04W 88/085* (2013.01)

(56) References Cited

U.S. PATENT DOCUMENTS

| | | |
|---|---|---|
| 8,867,572 B1 | 10/2014 | Zhan |
| 9,100,839 B2 | 8/2015 | Zhan |
| 9,402,190 B2 | 7/2016 | Zhan |
| 9,432,852 B2 | 8/2016 | Zhan et al. |
| 9,673,886 B2 | 6/2017 | Zhan et al. |
| 9,775,051 B2 | 9/2017 | Zhan |
| 9,936,396 B2 | 4/2018 | Zhan |
| 10,313,893 B2 | 6/2019 | Zhan |
| 10,585,460 B2 | 3/2020 | Mouser et al. |
| 11,265,075 B2 | 3/2022 | Zhan et al. |
| 11,349,556 B2 | 5/2022 | Zhan et al. |
| 2004/0110469 A1 | 6/2004 | Judd et al. |
| 2004/0166802 A1 | 8/2004 | McKay, Sr. et al. |
| 2006/0148468 A1 | 7/2006 | Mann et al. |
| 2007/0218951 A1 | 9/2007 | Risheq et al. |
| 2007/0254632 A1 | 11/2007 | Beadle et al. |
| 2008/0039012 A1 | 2/2008 | McKay et al. |
| 2008/0144543 A1 | 6/2008 | Hunton et al. |
| 2010/0035542 A1 | 2/2010 | Fujishima et al. |
| 2011/0006957 A1 | 1/2011 | Scire-Scappuzzo et al. |
| 2012/0189078 A1 | 7/2012 | Eom et al. |
| 2014/0139395 A1 | 5/2014 | Solondz |
| 2015/0070244 A1 | 3/2015 | McCown |
| 2015/0351135 A1 | 12/2015 | Schmidt et al. |
| 2016/0088494 A1 | 3/2016 | Zhan |
| 2016/0205633 A1 | 7/2016 | Mizusawa |
| 2016/0269132 A1 | 9/2016 | Clark et al. |
| 2016/0381563 A1 | 12/2016 | Khalek et al. |
| 2017/0111161 A1 | 4/2017 | Raggio et al. |
| 2017/0141837 A1 | 5/2017 | Cook et al. |
| 2017/0317738 A1 | 11/2017 | Lange |
| 2017/0331546 A1 | 11/2017 | Zhan et al. |
| 2018/0070323 A1 | 3/2018 | Zhan |
| 2018/0077585 A1 | 3/2018 | Zhan |
| 2018/0139708 A1 | 5/2018 | Zhan |
| 2018/0331752 A1 | 11/2018 | Ashworth et al. |
| 2018/0351633 A1 | 12/2018 | Birkmeir et al. |
| 2018/0364771 A1 | 12/2018 | Mouser et al. |
| 2019/0089452 A1* | 3/2019 | Ashworth .......... H04B 7/15571 |
| 2019/0123774 A1 | 4/2019 | Zhan et al. |
| 2019/0123805 A1 | 4/2019 | Zhan |
| 2019/0132024 A1 | 5/2019 | Zhan et al. |
| 2019/0140733 A1 | 5/2019 | Zhan |
| 2019/0196555 A1 | 6/2019 | Mouser et al. |
| 2019/0341995 A1 | 11/2019 | Ashworth et al. |
| 2019/0394734 A1 | 12/2019 | Zhan |
| 2020/0028568 A1 | 1/2020 | Zhan et al. |
| 2020/0029226 A1 | 1/2020 | Zhan |
| 2020/0076465 A1 | 3/2020 | Guo |
| 2020/0344739 A1 | 10/2020 | Rofougaran et al. |
| 2020/0350943 A1 | 11/2020 | Zhan et al. |
| 2020/0403688 A1 | 12/2020 | Zhan et al. |
| 2022/0399933 A1 | 12/2022 | Zhan et al. |

OTHER PUBLICATIONS

Pivotal Echo 5G 28 GHz Repeater with Holographic Beam Forming Technology Datasheet, dated May 2020 in 8 pages.
Pivotal Echo 5G 39 GHz Repeater with Holographic Beam Forming Technology Datasheet, dated May 2020 in 8 pages.
Pivotal Commware, Reducing 5G Deployment Costs using Holographic Beam Forming Repeaters from Pivotal Commware, dated May 2020 in 11 pages.
Pivot 5G 28 GHz Network Repeater with Holographic Beam Forming Technology Datasheet, dated Jun. 2020 in 8 pages.

\* cited by examiner

RADIO FREQUENCY SIGNAL BOOSTERS SERVING AS OUTDOOR INFRASTRUCTURE IN HIGH FREQUENCY CELLULAR NETWORKS

REFERENCE TO RELATED CASES

This application is a continuation of U.S. application Ser. No. 16/946,057, filed Jun. 4, 2020 and titled "RADIO FREQUENCY SIGNAL BOOSTERS SERVING AS OUTDOOR INFRASTRUCTURE IN HIGH FREQUENCY CELLULAR NETWORKS," which claims the benefit of priority under 35 U.S.C. § 119 of U.S. Provisional Patent Application No. 62/858,622, filed Jun. 7, 2019 and titled "RADIO FREQUENCY SIGNAL BOOSTERS SERVING AS OUTDOOR INFRASTRUCTURE IN HIGH FREQUENCY CELLULAR NETWORKS," and of U.S. Provisional Patent Application No. 62/915,350, filed Oct. 15, 2019 and titled "RADIO FREQUENCY SIGNAL BOOSTERS SERVING AS OUTDOOR INFRASTRUCTURE IN HIGH FREQUENCY CELLULAR NETWORKS," each of which is herein incorporated by reference in its entirety.

FIELD

Embodiments of the invention relate to electronic systems and, in particular, to radio frequency (RF) signal boosters.

BACKGROUND

A cellular or mobile network can include base stations for communicating with wireless devices located within the network's cells. For example, base stations can transmit signals to wireless devices via a downlink (DL) channel and can receive signals from the wireless devices via an uplink (UL) channel. In the case of a network using frequency division duplexing (FDD), the downlink and uplink communications are separated in the frequency domain and operate using a pair of frequency channels. In the case of a network using time division duplexing (TDD), the downlink and uplink communications are on a common frequency channel with uplink and downlink transmissions occurring during different time slots.

A wireless device may be unable to communicate with any base stations when located in a portion of the cellular network having poor or weak signal strength. To improve a network's signal strength and/or coverage, a radio frequency (RF) signal booster can be used to amplify signals in the network. For example, the signal booster can be used to amplify or boost signals having frequencies associated with the frequency ranges of the network's uplink and downlink channels.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description of Embodiments" one will understand how the features of this invention provide advantages that include improved communications between base stations and mobile devices in a wireless network.

In one aspect, a signal booster system for a high frequency cellular network is provided. The signal booster system includes a base station antenna configured to receive a downlink signal of a frequency band and to transmit an amplified uplink signal of the frequency band. The frequency band is higher than 20 gigahertz (GHz), and the base station antenna includes a parabolic antenna. The signal booster system further includes booster circuitry configured to amplify an uplink signal to generate the amplified uplink signal, and to amplify the downlink signal to generate an amplified downlink signal. The signal booster system further includes a mobile station antenna configured to receive the uplink signal and to transmit the amplified downlink signal.

In another aspect, a signal booster system for a high frequency cellular network is provided. The signal booster system includes a base station antenna configured to receive a downlink signal of a frequency band and to transmit an amplified uplink signal of the frequency band, wherein the frequency band is higher than 20 gigahertz (GHz). The signal booster system further includes booster circuitry configured to amplify an uplink signal to generate the amplified uplink signal, and to amplify the downlink signal to generate an amplified downlink signal. The signal booster system further includes a mobile station antenna configured to receive the uplink signal and to transmit the amplified downlink signal. At least one of the base station antenna or the mobile station antenna is implemented as a passive antenna array.

In another aspect, a signal booster system for a high frequency cellular network is provided. The signal booster system includes a base station antenna configured to receive a downlink signal and to transmit an amplified uplink signal, wherein the base station antenna is directional. The signal booster system further includes booster circuitry configured to amplify an uplink signal to generate the amplified uplink signal, and to amplify the downlink signal to generate an amplified downlink signal. The signal booster system further includes a mobile station antenna configured to receive the uplink signal and to transmit the amplified downlink signal. The booster circuitry includes a downlink amplification circuit configured to boost two or more frequency channels of a frequency band without channelization of the two or more frequency channels.

DETAILED DESCRIPTION OF EMBODIMENTS

Figure 1A:
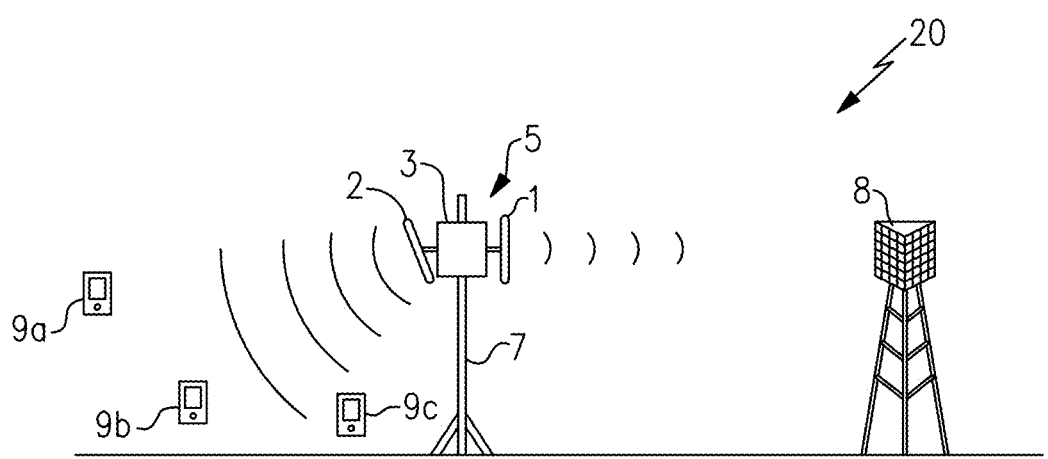
FIG. 1A is a schematic diagram of one embodiment of a signal booster system operating in a cellular network.

Various aspects of the novel systems, apparatus, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatus, and methods disclosed herein, whether implemented independently of, or combined with, any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

A number of challenges arise in implementing a high frequency cellular network, such as a fifth generation (5G) network. For example, signal propagation loss increases with frequency. Thus, signals in Frequency Range 2 (FR2) of 5G technologies, particularly at millimeter wave frequencies, suffer from very high signal loss. Moreover, a maximum communication range or distance for a given transmit power decreases with signal frequency.

Furthermore, objects in the network have a shielding effect on high frequency signals transmitted and received by mobile devices. Such objects include not only buildings, vehicles, and other such obstructions, but also smaller objects as well. For example, even leaves of a tree can significantly attenuate a high frequency signal.

Such effects cause signal strength to drop. In one example, signal loss reduces signal strength below a threshold for cellular communication, thereby preventing successful voice and/or data communication. In another example, a mobile device operates with higher transmit power to compensate for a loss in signal strength, and thus operates with greater power consumption and reduced battery life. In yet another example, the mobile device operates with lower signal quality, and thus lower data rate and/or lower voice quality.

Moreover, absorption of high frequency signals limits an ability to communicate using multi-path propagation. This in turn increases reliance on line of sight communications and increases a number of cellular access points (for instance, macro cell base stations, small cell base stations, and/or micro cell base stations) needed for providing sufficient network coverage.

There is also a rising demand to communicate with increased data rates to individual users, thereby enabling a range of emerging 5G applications and use cases. However, to accommodate high data rates, an increasingly large number of cellular access points are desired to provide sufficient bandwidth to accommodate nearby users.

Such challenges for high frequency cellular networks lead to a demand for a large number of cellular access points for providing network coverage. For example, in urban areas, cellular access points may be desired on each traffic light and/or lamp post in the city.

Increasing the density of cellular access points gives rise to constraints on infrastructure for backhaul. For example, conventional base stations operate with an optical fiber connection to a core network, further driving up cost of ownership and complexity of the cellular network. Not only in such infrastructure costly, but also decreases speed of deployment. For example, a significant investment of time can be needed to obtain city permits, negotiate easements, dig trenches for fiber or cables, and/or to complete installation.

Certain frequency bands include multiple frequency channels that are licensed to particular cellular carriers. For example, cellular carriers in the United States, such as Verizon, AT&T, T-Mobile, and Sprint can obtain a license to operate using one or more channels of the frequency band. From the perspective of a base station or mobile device operating in the cellular network of a particular cellular carrier, one or more of the channels in the frequency band are used by other cellular carrier(s) in different cellular network(s). A cellular carrier is also referred to herein as a wireless communications service provider or a mobile network operator.

To expand network coverage (for instance, to reduce or eliminate coverage gaps in a cell), a particular cellular carrier can include signal boosters that boost signals associated with the cellular carrier's network to thereby enhance signal strength.

Deployment of such signal boosters in a cellular network can be costly and/or complex when the signal boosters operate in a frequency band that includes frequency channels allocated amongst two or more cellular carriers. For example, one of more of the channels can be licensed by a first cellular carrier, such as AT&T, while one or more of the channels can be licensed by a second cellular carrier, such as Verizon. To further complicate matters, such licenses can vary regionally. For instance, a particular frequency channel can be licensed to AT&T in one city and to Verizon in another.

Thus, from the perspective of a particular cellular operator, signal boosters deployed in one city can be specified to amplify a different combination of frequency channels in the frequency band relative to signal boosters deployed in another city.

To amplify signals associated with particular frequency channels of the frequency band, filters can be used to separate individual frequency channels associated with a particular cellular carrier in a given geographical region. For example, signal boosters in AT&T's cellular network in a particular city can include bandpass filters for selecting channels licensed by AT&T in that city while attenuating channels licensed by other cellular carriers in that city, such as Verizon, T-Mobile, and/or Sprint.

Thus, a cellular carrier can deploy customized signal boosters with signal boosting targeted for particular channels licensed and/or otherwise owned or operated by the cellular carrier in a particular geographical region. Such customized signal boosters lead to a myriad of signal booster designs, which raises cost, increases complexity, and/or extends deployment time.

There is a need for a signal booster system that can serve as outdoor cellular infrastructure and that can be deployed across a range of geographical regions without a need for customized channel selection appropriate for a particular geographical region. Furthermore, there is a need for a wideband outdoor 5G millimeter wave signal booster that is mountable on a pole or other structure.

Signal booster systems for high frequency cellular communications are provided herein. In certain embodiments, a signal booster system includes a directional base station antenna, booster circuitry, and a mobile station antenna. The directional base station antenna receives a downlink signal, which a downlink amplification circuit of the booster circuitry amplifies to generate an amplified downlink signal that is transmitted on the mobile station antenna. Additionally, the mobile station antenna receives an uplink signal, which an uplink amplification circuit of the booster circuitry amplifies to generate an amplified uplink signal that is transmitted on the directional base station antenna. At least one of the uplink amplification circuit or the downlink amplification circuit operates over a frequency range that includes multiple channels over which several cellular carriers can operate. For example, one of more of the channels can be licensed by a first cellular carrier, such as AT&T, while one or more of the channels can be licensed by a second cellular carrier, such as Verizon.

Thus, the uplink amplification circuit can amplify the uplink signal over a frequency range that includes multiple channels, including those licensed to or otherwise operated by different cellular carriers. Additionally or alternatively, the downlink amplification circuit amplifies the downlink signal over a frequency range that includes the multiple channels. In certain implementations, the frequency range is continuous and covers at least 400 MHz, or more particularly, at least 800 MHz.

Accordingly, rather than using bandpass filters to select individual frequency channels for amplification, the directional base station antenna is used to receive a downlink signal from a particular direction and to transmit the amplified uplink signal in a particular direction. Thus, selectivity in frequency channel(s) is provided by pointing the directional base station antenna in a direction of high signal strength of the desired channels, rather than using bandpass filters to select particular channels for amplification by the booster circuitry. Thus, a need to separate each frequency channel or channelize is avoided.

By implementing the signal booster system in this manner, multiple instantiations of the same signal booster system can be deployed over a wide range of geographical regions, even when the particular combination of channels that are utilized by a cellular network change across those geographical regions. Thus, the cost and complexity of cellular infrastructure is reduced while speeding up an ability to expand a 5G network to new cities and regions. Moreover, in certain implementations, the signal booster system is flexibly deployable in cellular networks managed by different cellular carriers.

The inventors have recognized that a parabolic antenna is particularly advantageous for communicating with a base station at millimeter wave frequencies, while facilitating low system cost and rapid deployment of a 5G millimeter wave network.

The signal booster system operates without a need for wired or fiber connections to a core network. Thus, delay and cost associated with installing wired or fiber connections is avoided, such as overhead arising from obtaining city permits, negotiating easements, digging trenches for fiber or cables, and/or completing installation. Thus, the signal booster system aids in lowering costs and facilitating the rapid implementation of 5G networks.

In certain implementations, the base station antenna and/or the mobile station antenna are implemented as a passive multi-input multiple-output (MIMO) antenna array. Such passive MIMO antenna arrays include an array of antenna elements having spatial diversity and that are connected to a common RF signal feed. Thus, when receiving, the RF signals received at different antenna elements of the array combine to form an aggregate received signal. In one example, the passive MIMO antenna array includes an array of patch antenna elements formed on a printed circuit board (PCB). Since passive MIMO antenna arrays operate without individual phase shifters and amplifiers for each antenna element, passive MIMO antenna arrays can be implemented with low cost, low power, and/or compact size. A passive MIMO antenna array is also referred to herein as a passive antenna array.

FIG. 1A is a schematic diagram of one embodiment of a signal booster system 5 operating in a cellular network 20. The cellular network 20 represents a portion of a 5G network. The signal booster system 5 can be implemented using any suitable combination of features disclosed herein.

In the illustrated embodiment, the signal booster system 5 includes a directional base station antenna 1, a mobile station antenna 2, and a signal boosting unit 3 including booster circuitry therein. The signal booster system 5 is installed outdoors, and serves as an outdoor infrastructure booster system. In certain implementations, the signal booster system 5 is water proof. For example, at least a housing of the signal boosting unit 3 can be waterproofed.

The signal boosting unit 3 is attached to a pole 7, in this example. The signal boosting unit 3 can be attached to the pole 7 in a wide variety of ways, such as by using a wide variety of mounts, adhesives, and/or fasteners. Although FIG. 1A illustrates an example in which the signal boosting unit 3 is attached to the pole 7, the teachings herein are applicable to other configurations of installation. Examples of such installation configurations include attachment to buildings (for instance, walls or rooftops), bridges, tunnels, traffic lights, telephone poles, towers, and/or other structures.

In the illustrated embodiment, the directional base station antenna 1 and the mobile station antenna 2 are each connected to the signal boosting unit 3 using a short cable, for instance, a cable of 5 feet or less, or more particularly, 2 feet or less.

Although FIG. 1A illustrates an embodiment in which the directional base station antenna 1 and the mobile station antenna 2 are external to the signal boosting unit 3 and connected by a cable, the teachings herein are also applicable to implementations in which the directional base station antenna 1 and/or the mobile station antenna 2 are integrated with the signal boosting unit 3. For example, the directional base station antenna 1 and/or the mobile station antenna 2 can be implemented in and/or to extend from the housing of the signal boosting unit 3.

The signal booster system 5 advantageously operates without a need for a wired or fiber backhaul connection. Accordingly, the signal booster system 5 can have a relatively low installation cost and/or short installation time, thereby increasing speed of deployment in the cellular network 20. Furthermore, multiple instantiations of the signal booster system 5 (for instance, thousands or even millions) can be included in the 5G network, thereby reduce a number of base stations needed in the 5G network and lowering a total cost of infrastructure.

The directional base station antenna 1 includes a directional antenna that is pointed in a direction of high signal strength of the desired channels in the cellular network 20. For instance, in the illustrated embodiment, the signal booster system 5 is configured to wirelessly communicate with a cellular access point 8, which can be, for example, a base station, a cellular repeater, or another infrastructure signal booster. In one example, the cellular access point 8 corresponds to a base station servicing a neighborhood. In a second example, the cellular access point 8 corresponds to another infrastructure signal booster serving as an intermediary between a base station and the signal booster system 5.

In certain implementations, the receive downlink signal strength at the directional base station antenna 1 of the signal booster system 5 is in the range of about −50 dBm to about −70 dBm.

In certain implementations, the directional base station antenna 1 has a directionality of at least 30 dBi, or more particular, at least 36 dBi. For example, communications of the signal boosting unit 3 can be directional with between about 2 degrees to 3 degrees of beam width. By using the directional base station antenna 1, signal energy is focused to aid in overcoming signal path losses while reducing the signal strength of undesired frequency channels outside the beam width.

The signal booster system 5 includes the mobile station antenna 3 for communicating with user equipment (UE) of the cellular network 20, such as mobile devices 9a-9c.

Although the cellular network 20 is illustrated with specific examples of cellular access points and user equipment, the cellular network 20 can implemented with other types equipment. For instance, mobile devices can include mobile phones, tablets, laptops, wearable electronics (for instance, smart watches), and/or other types of user equipment (UE) suitable for use in a wireless communication network. Furthermore, cellular access points can include base stations, signal repeaters, infrastructure boosters, and/or other cellular infrastructure. Moreover any number of such devices and equipment can be present in the network 20.

In certain implementations, the mobile devices 9a-9c can communicate at least in part over multiple frequency bands, including one or more cellular bands associated with 3GPP 5G communications. Such 5G communications can include FR2 communications, such as those of 20 GHz or higher. Signals used in 5G communications are also referred to herein as 5G new radio (5G NR) signals.

In certain implementations, the signal booster system 5 can be configured to boost signals associated with two or more frequency bands so as to improve network reception for each of the mobile devices 9a-9c. Configuring the signal booster system 5 to service multiple frequency bands can improve network signal strength. For example, the signal booster system 5 can improve network signal strength of devices using the same or different frequency bands, the same or different cellular carriers, and/or the same or different wireless technologies. Configuring the signal booster system 5 as a multi-band booster can avoid the cost of separate signal boosters for each specific frequency band and/or cellular carrier.

Figure 1B:
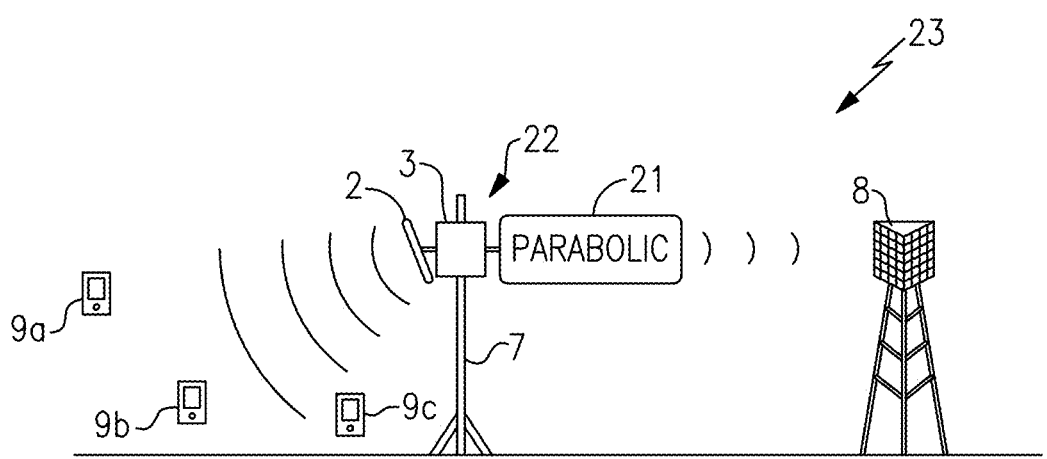
FIG. 1B is a schematic diagram of another embodiment of a signal booster system operating in a cellular network.

FIG. 1B is a schematic diagram of one embodiment of a signal booster system 22 operating in a cellular network 23. The signal booster system 22 can be implemented using any suitable combination of features disclosed herein.

The signal booster system 22 of FIG. 1B is similar to the signal booster system 5 of FIG. 1A, except that the signal booster system 22 includes a parabolic antenna 21 for serving as a directional base station antenna. The inventors have recognized that using the parabolic antenna 21 to communicate with the cellular access point 8 is particularly advantageous. For example, the parabolic antenna 21 can have excellent performance for communicating FR2 5G signals, and can have a low cost that facilitates rapid and wide deployment of the signal booster system 22 in the cellular network 23.

In certain implementations, the signal booster system 22 includes any combination (one or more) of the following features: (i) wideband operation amplifying multiple channels of (for instance, a full bandwidth of) a 5G NR band, such as n261; (ii) amplification of FR2/millimeter wave signals without any frequency upconversion or frequency downconversion; and/or (iii) short cables of less than 5 feet, or more particularly less than 2 feet, for both the antenna 2 and the antenna 21.

The signal booster system 22 is mountable on a pole or other structure, and can be waterproofed for outdoor operation.

Figure 2:
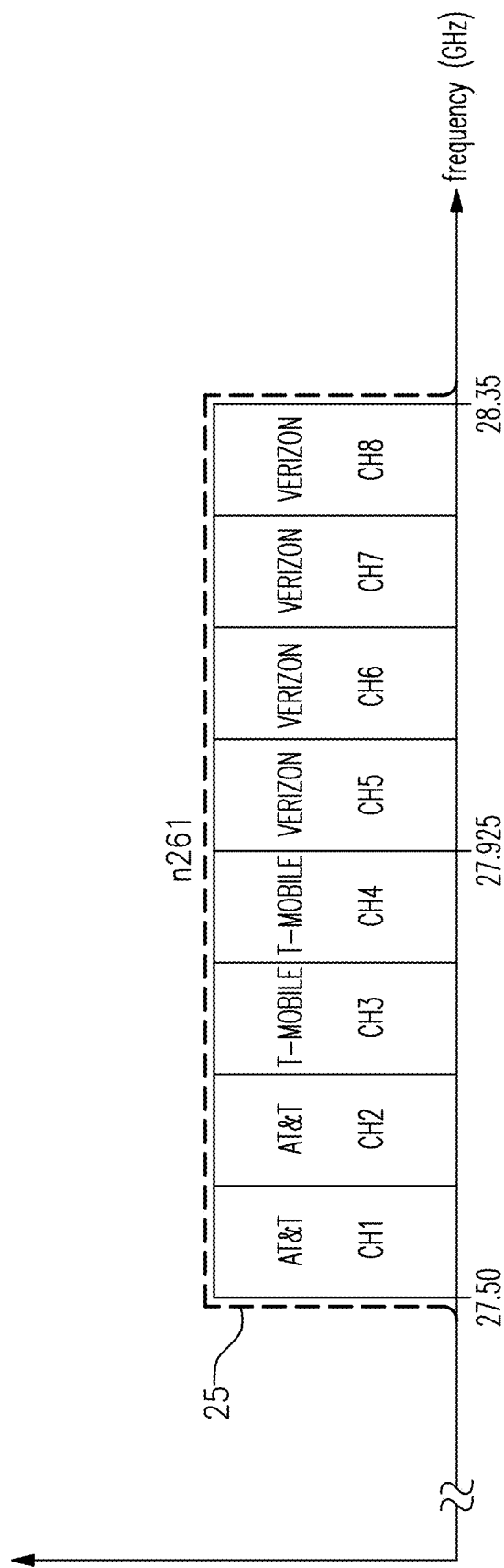
FIG. 2 is one embodiment of a frequency diagram for a signal booster system.

FIG. 2 is one embodiment of a frequency diagram for a signal booster system. The frequency diagram depicts eight frequency channels (CH1, CH2, CH3, CH4, CH5, CH6, CH7, and CH8) associated with frequency band n261 of 5G. The frequency channels are contiguous, in this example.

Although depicted in the context of 5G frequency band n261 (27.50 GHz to 28.35 GHz), the teachings herein are applicable to a wide variety of frequency bands, including, but not limited to, 5G frequency band n257 (26.50 GHz to 29.50 GHz), 5G frequency band n258 (24.25 GHz to 27.50 GHz), and/or 5G frequency band n260 (37.00 GHz to 40.00 GHz).

Furthermore, although an example in which the frequency channels have about 100 MHz is depicted, the teachings herein are applicable to frequency channels having other bandwidths.

In the illustrated embodiment, each of the illustrated channels or groups thereof can be separately licensed to particular cellular carriers. For instance, in the example of FIG. 2, CH1 and CH2 are licensed to AT&T, CH3 and CH4 are licensed to T-Mobile, and CH5, CH6, CH7, and CH8 are licensed to Verizon.

Thus, from the perspective of a base station or mobile device operating in the cellular network of a particular cellular carrier, one or more of the channels in the frequency band are used by other cellular carriers in different cellular networks. For instance, with respect to base stations and mobile devices operating in T-Mobile's cellular network, signals on CH1, CH2, CH5, CH6, CH7, and CH8 represent signals of other cellular carriers, in this example.

To further complicate matters, such licenses can vary regionally. For instance, a particular frequency channel can be licensed to AT&T in one city and to Verizon in another. Thus, although CH1 and CH2 are licensed by AT&T in the example of FIG. 2, another cellular carrier (for instance, Verizon, T-Mobile and/or Sprint) can license CH1 and/or CH2 in another geographical region.

To expand network coverage (for instance, to reduce or eliminate coverage gaps in a cell), a particular cellular carrier can amplify individual frequency channels associated with a particular cellular carrier in a given geographical region. For example, in the example of FIG. 2, signal boosters in AT&T's cellular network in a particular city can include bandpass filters for selecting channels licensed by AT&T in that city (for instance, CH1, CH2) while attenuating channels licensed by other carriers in that city (for instance, CH3, CH4, CH5, CH6, CH7, and CH8).

However, such customized signal boosters lead to a myriad of signal booster designs, which raises cost, increases complexity, and/or extends deployment time.

In certain embodiments herein, a signal booster system includes a directional base station antenna, booster circuitry, and a mobile station antenna. The directional base station antenna receives a downlink signal, which a downlink amplification circuit of the booster circuitry amplifies to generate an amplified downlink signal that is transmitted on the mobile station antenna. Additionally, the mobile station antenna receives an uplink signal, which an uplink amplification circuit of the booster circuitry amplifies to generate an amplified uplink signal that is transmitted on the directional base station antenna. The uplink amplification circuit and downlink amplification circuit each operate over a frequency range that includes multiple channels, which can be licensed or otherwise utilized by multiple cellular carriers.

For example, with respect to the example of FIG. 2, the uplink amplification circuit and the downlink amplification circuit can operate over a frequency range 25, which includes frequency channels of multiple cellular carriers (AT&T, T-Mobile, and Verizon, in this example). Although an example in which the frequency range 25 covers the full frequency band (5G frequency band n261, in this example), the frequency range can also cover a portion of a frequency band. For example, in another embodiment, the uplink amplification circuit and the downlink amplification circuit operate over half of a frequency band. For instance, in the context of 5G frequency band n261, the frequency range can cover between 27.50 GHz and 27.925 GHz or between 27.925 GHz and 28.35 GHz in such an embodiment.

Thus, the uplink amplification circuit amplifies the uplink signal over a frequency range that includes multiple channels, including those licensed to or otherwise operated by different cellular carriers. Additionally, the downlink amplification circuit amplifies the downlink signal over a frequency range that includes the multiple channels.

Accordingly, rather than using bandpass filters to select individual frequency channels for amplification, the directional base station antenna is used to receive a downlink signal from a particular direction and to transmit the amplified uplink signal in a particular direction. Thus, selectivity in frequency channel(s) is provided by pointing the directional base station antenna in a direction of high signal strength of the desired channels, rather than using bandpass filters to select particular channels for amplification by the booster circuitry.

By implementing the signal booster system in this manner, multiple instantiations of the same signal booster system can be deployed over a wide range of geographical regions, even when the particular combination of channels that are licensed change across those geographical regions. Thus, the cost and complexity of cellular infrastructure is reduced while speeding up an ability to expand a 5G network to new cities or regions. Moreover, in certain implementations, the signal booster system is flexibly deployable in cellular networks managed by different cellular carriers, thereby further lowering cost and complexity.

Figure 3A:
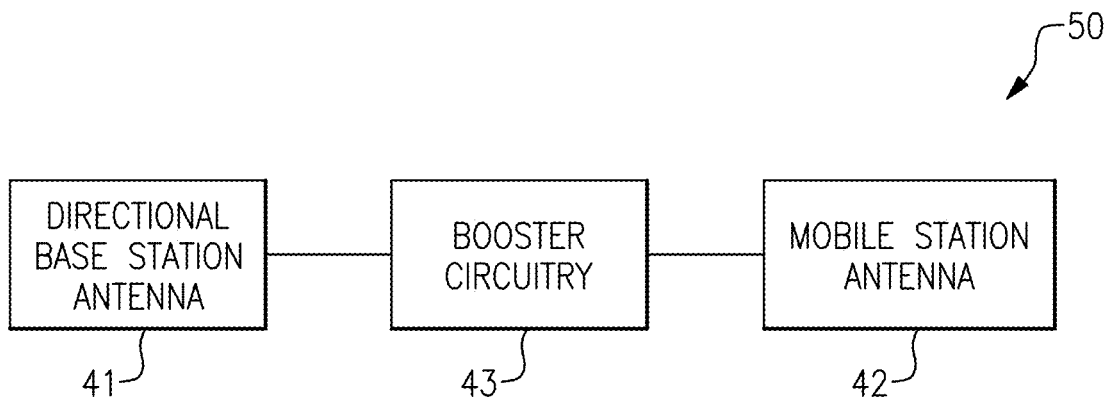
FIG. 3A is a schematic diagram of another embodiment of a signal booster system.

FIG. 3A is a schematic diagram of another embodiment of a signal booster system 50. The signal booster system 50 includes a directional base station antenna 41, a mobile station antenna 42, and booster circuitry 43.

The signal booster system 50 of FIG. 3A illustrates one embodiment of the signal booster system 5 of FIG. 1A.

The directional base station antenna 41 receives a downlink signal, which is amplified by the booster circuitry 43 to generate an amplified downlink signal that is transmitted on the mobile station antenna 42. Additionally, the mobile station antenna 42 receives an uplink signal, which is amplified by the booster circuitry 43 to generate an amplified uplink signal that is transmitted on the directional base station antenna 41.

In certain implementations, the signal booster system 50 operates at least in part using time division duplexing (TDD) in which uplink and downlink transmissions occur in different time slots or windows.

The booster circuitry 43 provides amplification to RF signals associated with two or more frequency channels. Additionally, the booster circuitry 43 includes an uplink amplification circuit amplifies the uplink signal over a frequency range that includes multiple frequency channels, including those licensable to or otherwise operated by different cellular carriers. Additionally, the downlink amplification circuit amplifies the downlink signal over a frequency range that includes the multiple channels.

The booster circuitry 43 can include a wide variety of circuitry and/or components. Examples of circuitry and components of the booster circuitry 43 include, but are not limited to, amplifiers (for instance, LNAs, power amplifiers (PAs), variable gain amplifiers (VGAs), programmable gain amplifiers (PGAs), and/or other amplification circuits), filters (for instance, surface acoustic wave (SAW) filters, bulk acoustic wave (BAW) filters, film bulk acoustic resonator (FBAR) filters, active circuit filters, passive circuit filters, and/or other filtering structures), duplexers, circulators, frequency multiplexers (for instance, diplexers, triplexers, or other multiplexing structures), switches, impedance matching circuitry, attenuators (for instance, digital-controlled attenuators such as digital step attenuators (DSAs) and/or analog-controlled attenuators such as voltage variable attenuators (VVAs)), detectors, monitors, couplers, and/or control circuitry.

Figure 3B:
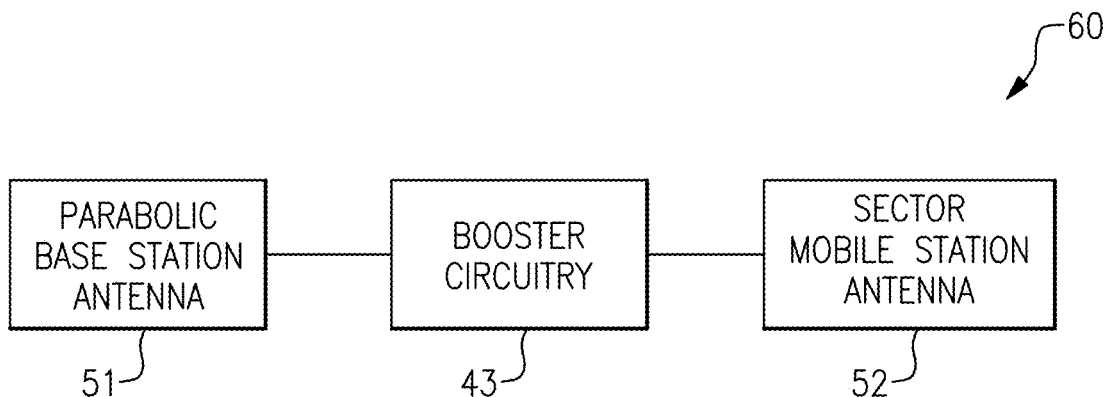
FIG. 3B is a schematic diagram of another embodiment of a signal booster system.

FIG. 3B is a schematic diagram of another embodiment of a signal booster system 60.

The signal booster system 60 of FIG. 3B is similar to the signal booster system 50 of FIG. 3A, except that the signal booster system 60 of FIG. 3B includes a specific implementation of antennas. In particular, the signal booster system 60 includes a parabolic base station antenna 51 and a sector mobile station antenna 52.

In certain implementations, the parabolic base station antenna 51 has a directivity of at least 30 dBi, or more particularly, 36 dBi or more.

As shown in FIG. 3B, the signal booster system 60 includes the sector mobile station antenna 52. In certain implementations, the sector mobile station antenna 52 has a directivity of 20 dBi or less, or more particularly, 17 dBi or less.

Figure 3C:
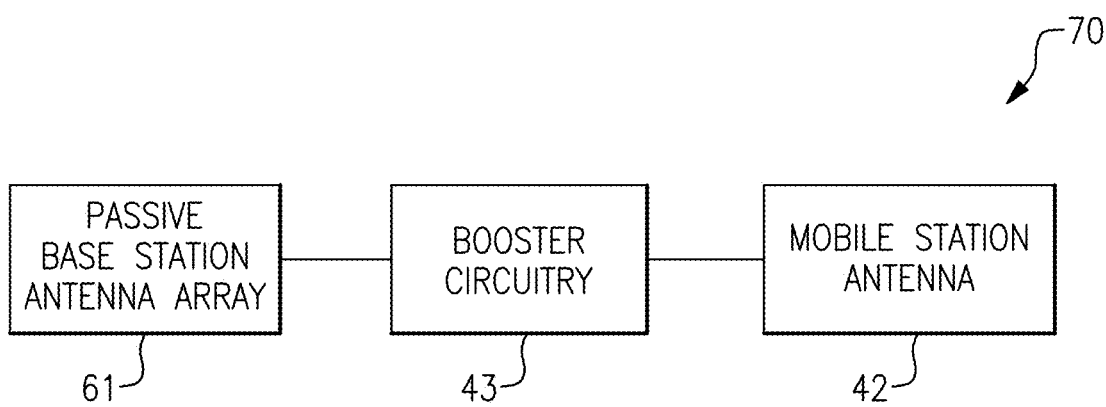
FIG. 3C is a schematic diagram of another embodiment of a signal booster system.

FIG. 3C is a schematic diagram of another embodiment of a signal booster system 70.

The signal booster system 70 of FIG. 3C is similar to the signal booster system 50 of FIG. 3A, except that the signal booster system 70 of FIG. 3C includes a specific implementation of a directional base station antenna. In particular, the signal booster system 70 includes a passive base station antenna array 61.

The passive base station antenna array 61 includes multiple antenna elements having spatial diversity, and is also referred to herein as a passive spatial diversity antenna array. In certain implementations, the 1 passive base station antenna array 61 includes an array of planar antennas, such as patch antennas, arranged on a substrate, such as a printed circuit board (PCB). By implementing a base station antenna as a passive base station antenna array, enhanced directivity and/or higher signal-to-noise ratio (SNR) can be achieved.

Figure 3D:
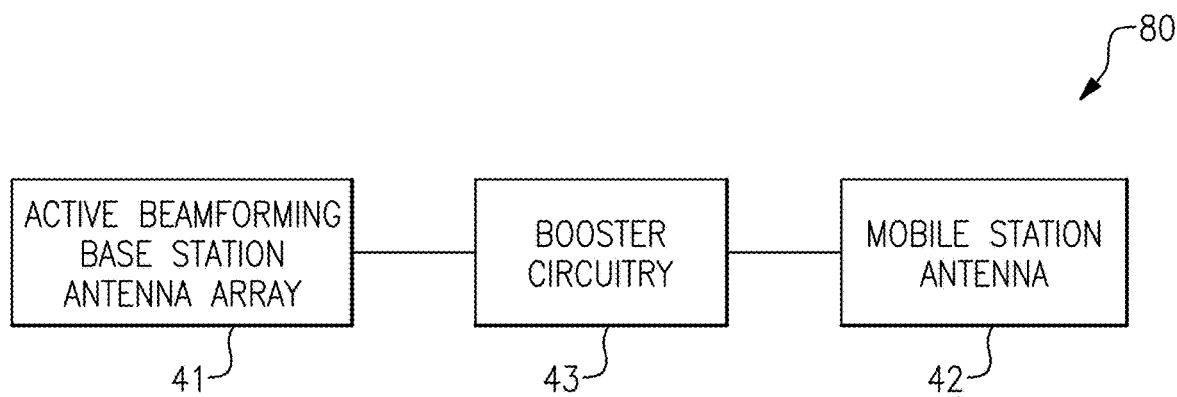
FIG. 3D is a schematic diagram of another embodiment of a signal booster system.

FIG. 3D is a schematic diagram of another embodiment of a signal booster system 80.

The signal booster system 80 of FIG. 3D is similar to the signal booster system 50 of FIG. 3A, except that the signal booster system 80 of FIG. 3D includes a specific implementation of a directional base station antenna. In particular, the signal booster system 80 includes an active beamforming base station antenna array 71.

Implementing the signal booster system 80 with the active beamforming base station antenna array 71 aids in providing beamforming that can allow the signal booster system 80 to control the angle of signals transmitted or received. For example, the active beamforming base station antenna array 71 can include an array of antenna elements each associated with a controllable gain element and a controllable phase element. By controlling the gain and phase of signals transmitted and/or received by each element of the array, beamforming can be achieved.

For instance, with respect to signal transmission, the gain and phase of the signals transmitted on each antenna element can be controlled such that the signals radiated from the antenna elements combine using constructive and destructive interference to generate an aggregate transmit beam pointing in a desired direction. Additionally, with respect to the signal reception, the gain and phase of signals received on each antenna element can be controlled such that the combined received signal favors signals received from a particular direction.

Implementing the signal booster system 80 with the active beamforming base station antenna array 71 provides a number of advantages. For example, when the signal booster system 80 is installed on the pole 7 of FIG. 1A, beamforming can be used to compensate for an installation error in pointing the signal booster system 80 toward the cellular access point 8.

Moreover, in certain implementations, the signal booster system 80 can be implemented to regularly realign or calibrate a direction of beamforming, thereby compensating for changes in the relative positions and/or orientations of the signal booster system 80 and/or the cellular access point 8 over time. For instance, when installed on the pole 7, the position of the signal booster system 80 can change due to weather and/or handling.

Accordingly, beamforming can be used to align communications between the signal booster system 80 and the cellular access point 8, thereby enhancing the strength of the wireless communication link therebetween.

Figure 3E:
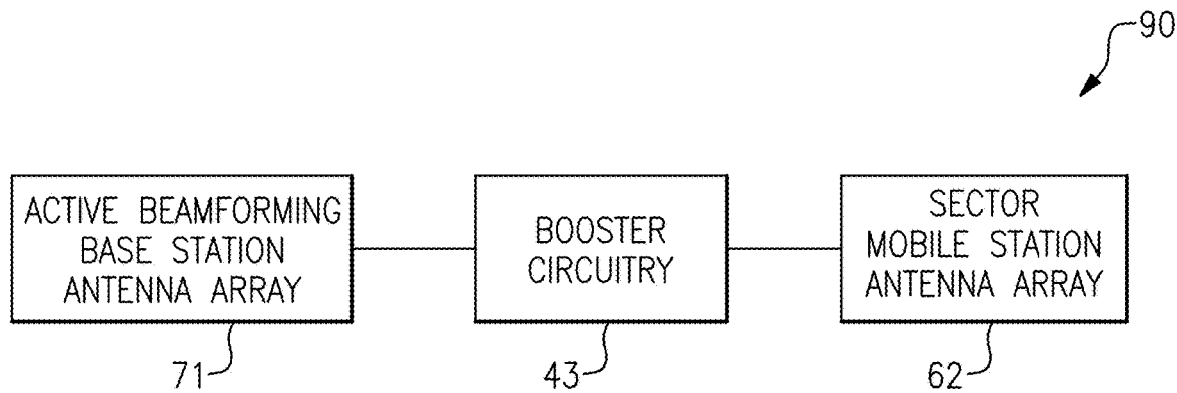
FIG. 3E is a schematic diagram of another embodiment of a signal booster system.

FIG. 3E is a schematic diagram of another embodiment of a signal booster system 90.

The signal booster system 90 of FIG. 3E is similar to the signal booster system 80 of FIG. 3D, except that the signal booster system 90 of FIG. 3E includes a specific implementation of a mobile station antenna. In particular, the signal booster system 90 includes a sector mobile station antenna array 62.

Thus, the signal booster system 90 includes an array of two or more sector antennas to serve as a mobile station antenna. In one example, a two-by-two (2×2) array of sector antennas each covering about ninety degrees of angular range is provided.

Figure 3F:
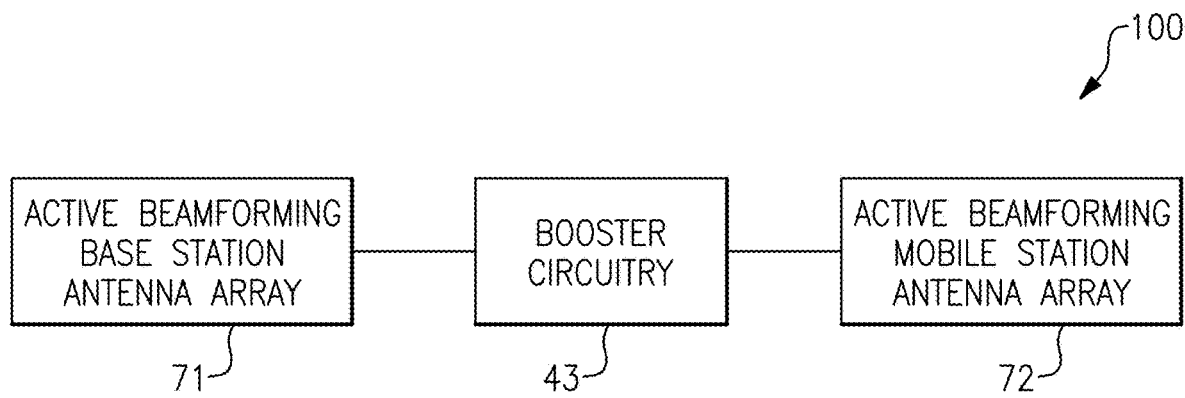
FIG. 3F is a schematic diagram of another embodiment of a signal booster system.

FIG. 3F is a schematic diagram of another embodiment of a signal booster system 100.

The signal booster system 100 of FIG. 3F is similar to the signal booster system 80 of FIG. 3D, except that the signal booster system 100 of FIG. 3F includes a specific implementation of a mobile station antenna. In particular, the signal booster system 100 includes an active beamforming mobile station antenna array 72.

Accordingly, both the mobile station antenna and the base station antenna operate with beamforming, in this embodiment.

Figure 3G:
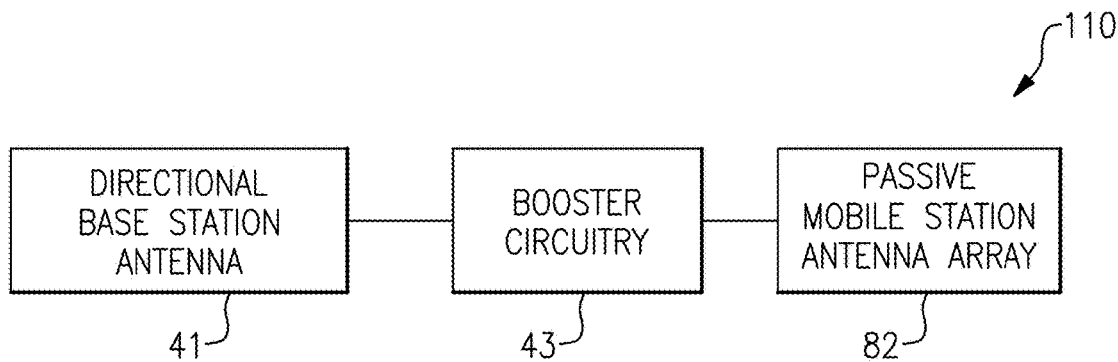
FIG. 3G is a schematic diagram of another embodiment of a signal booster system.

FIG. 3G is a schematic diagram of another embodiment of a signal booster system 110. The signal booster system 110 of FIG. 3G is similar to the signal booster system 50 of FIG. 3A, except that the signal booster system 110 of FIG. 3G includes a specific implementation of a mobile station antenna. In particular, the signal booster system 110 includes a passive mobile station antenna array 82.

Figure 3H:
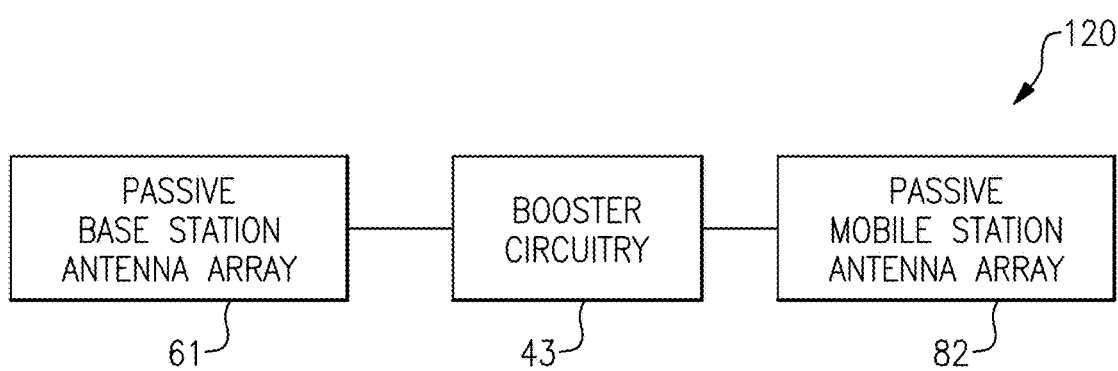
FIG. 3H is a schematic diagram of another embodiment of a signal booster system.

FIG. 3H is a schematic diagram of another embodiment of a signal booster system 120. The signal booster system 120 of FIG. 3H is similar to the signal booster system 110 of FIG. 3G, except that the signal booster system 120 of FIG. 3H includes a specific implementation of a base station antenna. In particular, the signal booster system 120 includes a passive base station antenna array 61.

With reference to FIGS. 3C, 3G, and 3H, the teachings herein are applicable to signal booster systems in which the base station antenna and/or the mobile station antenna is implemented as a passive antenna array. For example, implementing an antenna in this manner can aid in achieving high signal gain, excellent front-to-back isolation ratio, low cost, and/or compact size.

Figure 3I:
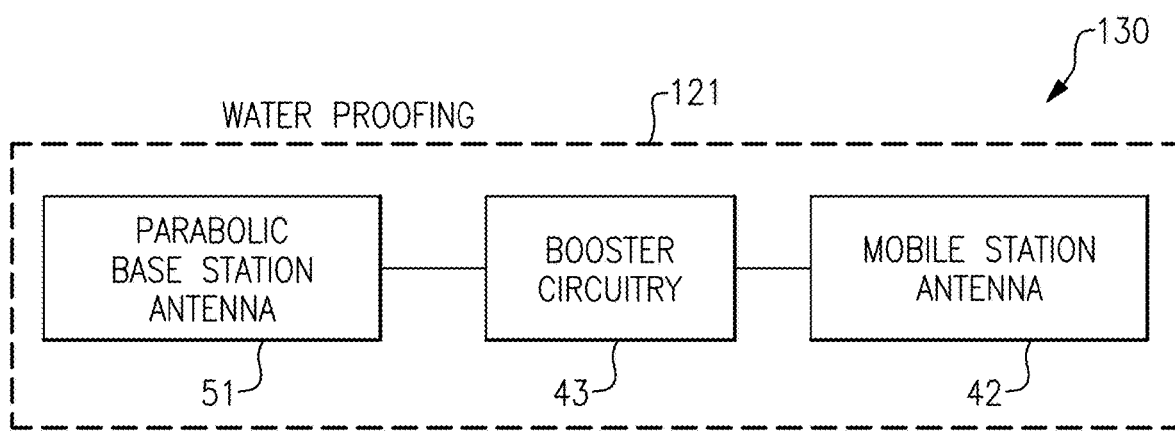
FIG. 3I is a schematic diagram of another embodiment of a signal booster system.

FIG. 3I is a schematic diagram of another embodiment of a signal booster system 130.

The signal booster system 130 of FIG. 3I is similar to the signal booster system 80 of FIG. 3D, except that the signal booster system 130 of FIG. 3I includes a specific implementation of a directional base station antenna. In particular, the signal booster system 130 includes a parabolic base station antenna 51. Additionally, the signal booster system 130 is implemented with water proofing 121 for outdoor use. Such water proofing 121 can be applied to at least a housing of the booster circuitry 43. In certain implementations, the water proofing 121 is applied to a housing of the booster circuitry 43, the parabolic base station antenna 51, the mobile station antenna 42, and to any cables connecting the antennas to the housing.

Any of the signal booster systems herein can include a parabolic base station antenna and/or water proofing.

Figure 4:
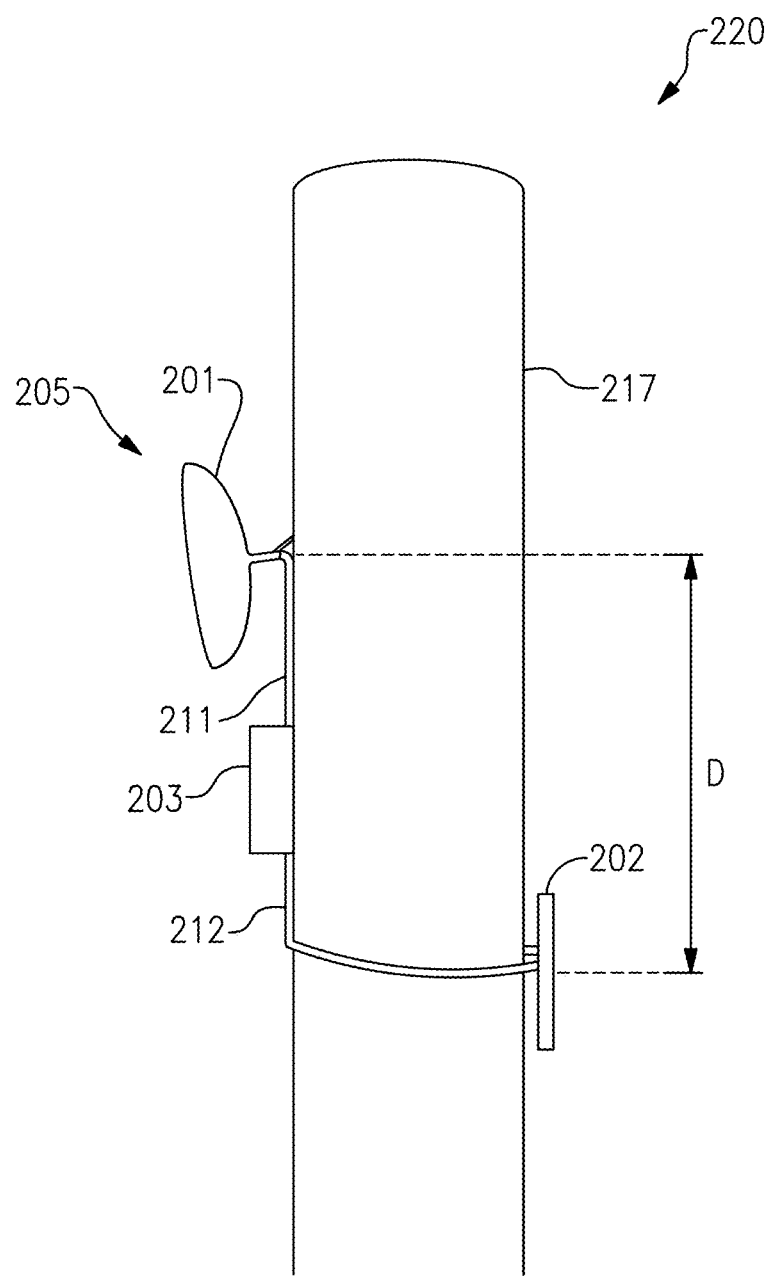
FIG. 4 is a schematic diagram of another embodiment of a signal booster system operating in a cellular network.

FIG. 4 is a schematic diagram of another embodiment of a signal booster system 205 operating in a cellular network 220.

The signal booster system 205 includes a directional base station antenna 201 (implemented as a parabolic antenna, in this example), a mobile station antenna 202 (implemented as a sector antenna, in this example), a signal boosting unit 203, a first cable 211, and a second cable 212.

The signal booster system 205 is installed on a pole 217, in this example. Additionally, the directional base station antenna 201 and the mobile station antenna 202 are attached to opposite sides of the pole 217 to provide enhanced antenna-to-antenna isolation.

As shown in FIG. 4, the directional base station antenna 201 and the mobile station antenna 202 are vertically offset from one another by a distance D. In one embodiment, the distance D is selected be between 1 meter and 3 meters, thereby providing a further enhancement to antenna-to-antenna isolation. Furthermore, limiting the distance D to 3 meters aids in reducing cable lengths, which provide signal loss that increases with signal frequency.

The signal booster system 205 is implemented with one or more features to enhance robustness to outdoor conditions. For example, in certain implementations, the directional base station antenna 201, the mobile station antenna 202, the signal boosting unit 203, the first cable 211, and the second cable 212 are compliant with IP67 rating.

In certain implementations, the signal booster system 205 is powered using an AC power supply, such as 120 VAC. However, other implementations, are possible, for instance, DC power from a battery, solar power, and/or other powering schemes.

Figure 5:
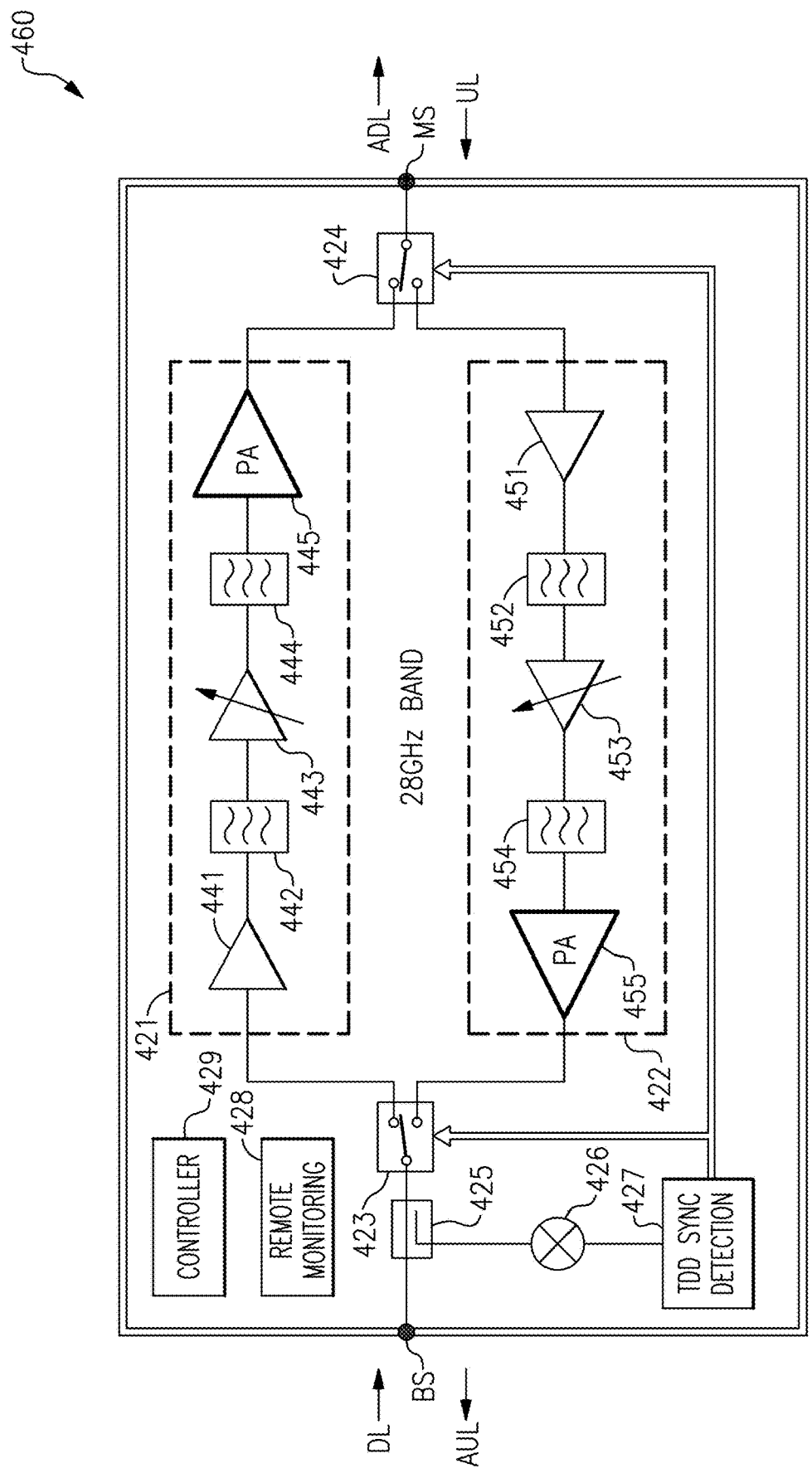
FIG. 5 is a schematic diagram of one embodiment of booster circuitry for a signal booster system.

FIG. 5 is a schematic diagram of one embodiment of booster circuitry 460 for a signal booster system.

The booster circuitry 460 includes a downlink amplification circuit 421, an uplink amplification circuit 422, a first TDD switch 423, a second TDD switch 424, a directional coupler 425, a downconverting mixer 426, a TDD synchronization detection circuit 427, a remote monitoring circuit 428, and a controller 429. The booster circuitry 460 further includes a base station antenna terminal BS for connecting to a base station antenna, and a mobile station antenna terminal MS for connecting to a mobile station antenna.

Although one embodiment of booster circuitry for a signal booster system is shown, the teachings herein are applicable to booster circuitry implemented in a wide variety of ways.

As shown in FIG. 5, the first TDD switch 423 selectively connects the base station antenna terminal BS to an input of the downlink amplification circuit 421 or to an output of the uplink amplification circuit 422. Additionally, the second TDD switch 424 selectively connects the mobile station antenna terminal MS to an output of the downlink amplification circuit 421 or to an input of the uplink amplification circuit 422.

Thus, a state of the first TDD switch 423 and the second TDD switch 424 can be controlled to selectively provide amplification to a downlink signal DL received on the base station antenna terminal BS or to an uplink signal UL received on the mobile station antenna terminal MS.

For example, when the first TDD switch 423 and the second TDD switch 424 select the downlink amplification circuit 421, the downlink amplification circuit 421 amplifies the downlink signal DL received on the base station antenna terminal BS to generate an amplified downlink signal ADL on the mobile station antenna terminal MS. Additionally, when the first TDD switch 423 and the second TDD switch 424 select the uplink amplification circuit 422, the uplink amplification circuit 422 amplifies the uplink signal UL received on the mobile station antenna terminal MS to generate an amplified uplink signal AUL on the base station antenna terminal BS.

Although shown as including a first TDD switch 423 and a second TDD switch 424, other implementations are possible. For example, in another embodiment a circulator is used in place of or combined with a TDD switch to allow handling of higher signal power.

In the illustrated embodiment, the booster circuitry 460 includes the TDD synchronization detection circuit 427 for controlling the state of the first TDD switch 423 and the second TDD switch 424. As shown in FIG. 5, the TDD synchronization detection circuit 427 is coupled to the base station antenna terminal BS by way of the directional coupler 425 and the downconverting mixer 426. Although one location along the downlink signal path is shown for coupling the TDD synchronization detection circuit 427, other implementations are possible. For example, in another embodiment, TDD synchronization detection is provided after amplifying the downlink signal. For instance, the TDD synchronization detection circuit 427 can be positioned at the output of the downlink amplification circuit 441.

The directional coupler 425 serves to generate a sensed downlink signal based on sensing the downlink signal DL received on the base station antenna terminal BS. Additionally, the downconverting mixer 426 serves to downconvert the sensed downlink signal to generate a downconverted downlink signal for processing by the TDD synchronization detection circuit 427. Although not shown in FIG. 5, the downconverting mixer 426 receives a local oscillator (LO) signal for controlling the frequency used for downconversion. In certain implementations, the frequency of the LO signal can be selected to be about equal to the carrier frequency of the downlink signal DL, for instance, about 28 GHz, in this example. In other implementations, an intermediate frequency (IF) is used for downconversion.

With continuing reference to FIG. 5, the TDD synchronization detection circuit 427 processes the downconverted downlink signal to recover network timing information indicating time slots used for uplink and downlink transmissions. Accordingly, the TDD synchronization detection circuit 427 processes the downconverted downlink signal to determine network timing information, and uses the recovered network timing information to control the state of the first TDD switch 423 and the second TDD switch 424. Although the TDD synchronization detection circuit 427 processes the downconverted downlink signal to recover network timing information, the TDD synchronization detection circuit 427 need not fully recover data carried by the downlink signal DL.

By including the TDD synchronization detection circuit 427, the downlink amplification circuit 421 is activated during time slots used for transmitting the downlink signal DL, and the uplink amplification circuit 422 is activated during time slots used for transmitting the uplink signal UL.

In the illustrated embodiment, the downlink amplification circuit 421 includes a low noise amplifier (LNA) 441, a first bandpass filter 442, a controllable gain amplifier 443, a second bandpass filter 444, and a power amplifier (PA) 445. Additionally, the uplink amplification circuit 422 includes an LNA 451, a first bandpass filter 452, a controllable gain amplifier 453, a second bandpass filter 454, and a PA 455. In this example, the downlink amplification circuit 421 and the uplink amplification circuit 422 are implemented for providing boosting of uplink and downlink signals, respectively, in the 28 GHz band. However, the teachings herein are applicable to other frequency ranges and bands.

Although one embodiment of downlink and uplink amplification circuits is shown, the teachings herein are applicable to downlink and uplink amplification circuits implemented in a wide variety of ways.

Advantageously, neither the downlink amplification circuit 421 nor the uplink amplification circuit 422 operate with any frequency upconversion or frequency downconversion.

The downlink amplification circuit 421 and the uplink amplification circuit 422 are configured to provide signal boosting over a frequency range that includes multiple channels licensed or otherwise utilized by multiple cellular carriers. For example, one of more of the channels can be licensed by a first cellular carrier, such as AT&T, while one or more of the channels can be licensed by a second cellular carrier, such as Verizon.

Thus, the uplink amplification circuit amplifies the uplink signal over a frequency range that includes multiple channels, including those licensed to or otherwise operated by different cellular carriers. Additionally, the downlink amplification circuit amplifies the downlink signal over a frequency range that includes the multiple channels. In certain implementations, the frequency range spans at least 400 MHz, or more particularly, at least 800 MHz.

Accordingly, rather than using bandpass filters to select individual frequency channels for amplification, multiple channels are selected and simultaneously amplified together using common amplifiers. For example, the bandwidth of bandpass filters (for instance, bandpass filters 442, 444, 452, and/or 454) can be implemented to pass the frequency range including the multiple channels while attenuating or blocking other frequencies. Thus, a need to separate each frequency channel or channelize is avoided.

The controller 429 provides a number of control functionalities associated with the booster circuitry 460. The controller 429 can be implemented in a wide variety of ways, for instance, as a microprocessor, microcontroller, computer processing unit (CPU), and/or other suitable control circuitry. Example functions of the controller 429 are power control (for instance, automatic gain control), oscillation detection, and/or shutdown.

In the illustrated embodiment, the controller 429 provides control over gain of the controllable gain amplifier 443 of the downlink amplification circuit 421 and the controllable gain amplifier 453 of the uplink amplification circuit 422. However, other implementation of gain control are possible. For example, the control circuitry can control the attenuation provided by controllable attenuation components (for instance, digital step attenuators and/or voltage variable attenuators) and/or the gain provided by controllable gain amplifiers (for instance, variable gain amplifiers and/or programmable gain amplifiers).

Although not depicted in FIG. 5, the downlink amplification circuit 421 and/or the uplink amplification circuit 422 can include one or more power detectors for generating power detection signals for the controller 429. Additionally or alternatively, other detectors or sensors, such as a temperature detector, can aid the controller 429 in providing information used for control functionality.

Although depicted as including one uplink amplification circuit and one downlink amplification circuit, multiple uplink amplification circuits and downlink amplification circuits can be included, for instance, for each frequency band for which the booster circuitry provides signal boosting.

In certain implementations, the controller 429 is shared by multiple uplink amplification circuits and/or downlink amplification circuits. For example, the controller 429 can correspond to a processing chip (for instance, a microprocessor chip, microcontroller chip, or CPU chip) that provides centralized control of a signal booster system.

In the illustrated embodiment, the booster circuitry 460 further includes the remote monitoring circuit 428, which provides remote monitoring. In certain implementations, the remote monitoring circuit 428 includes a transceiver for communicating information pertaining to operation of a signal booster system with another device, such as a computer (for instance, a desktop or laptop), a tablet, or a mobile phone. Thus, remote access and control to a signal booster system can be provided. Remote monitoring and control is wireless in certain implementations, for instance, by using a wireless interface controlled by a cellular modem and/or Internet of Things (IoT) modem.

Examples of such information includes, but is not limited to, whether the signal booster system is powered, whether boosting is active for one or more bands, antenna status, a temperature condition, and/or whether oscillation/pre-oscillation has occurred. In certain implementations, the remote monitor 428 can be used to receive instructions for remote shut-down or power control, remote control of gain and/or attenuation (including, for example, band specific control), and/or remote control of antenna selection (for instance, in multi-antenna configurations). In yet another example, the remote monitor 428 receives settings for beamforming.

In the illustrated embodiment, the booster circuitry 460 operates without frequency upconversion and without frequency downconversion. Thus, the frequency of an amplified uplink signal outputted by the booster circuitry 460 is equal to the frequency of the received uplink signal, and the frequency of the amplified downlink signal outputted by the booster circuitry 460 is equal to the frequency of the received downlink signal.

By operating without frequency upconversion/downconversion, lower latency group delay is provided. This in turns facilitates enhanced layer performance and/or increased tolerance to multipath signals.

Figure 6A:
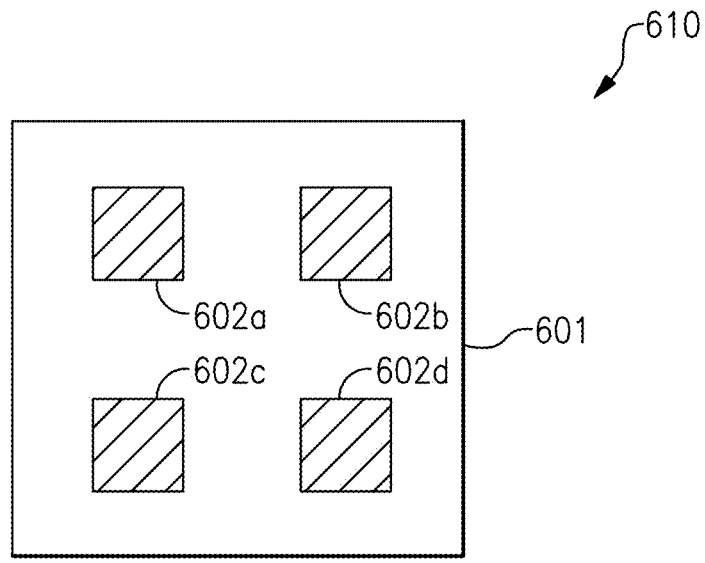
FIG. 6A is a diagram of an overhead or frontal view of one embodiment of a passive antenna array.
Figure 6B:
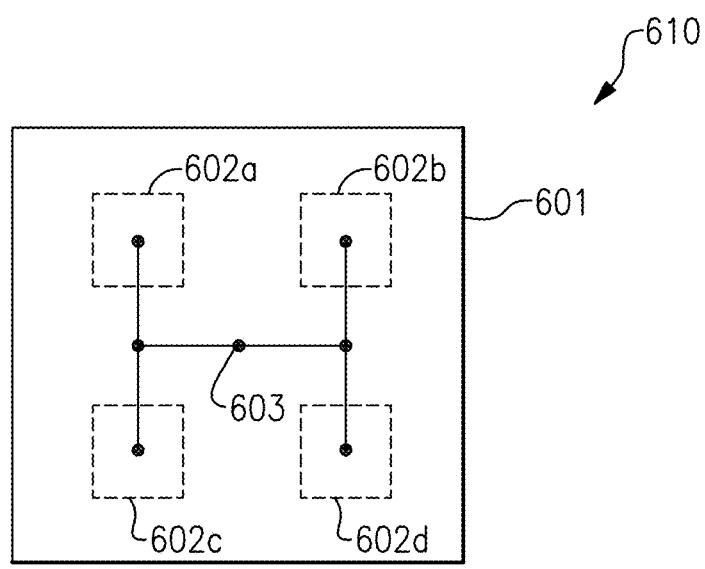
FIG. 6B is a diagram of a backside view of the passive antenna array of FIG. 6A.

FIG. 6A is a diagram of an overhead view of one embodiment of a passive antenna array 610. FIG. 6B is a diagram of a backside view of the passive antenna array 610 of FIG. 6A. The passive antenna array 610 includes a first patch antenna element 602a, a second patch antenna element 602b, a third patch antenna element 603c, and a fourth patch antenna element 602d formed on a first or front surface of an antenna substrate 601, such as a printed circuit board (PCB).

The passive antenna array 610 illustrates one embodiment of a passive antenna array for serving as a base station antenna or a mobile station antenna. However, the teachings herein are applicable to base station antennas and mobile station antennas implemented in a wide variety of ways, including, but not limited to, using other configurations of passive antenna arrays or other directional antennas.

The antenna elements 602a-602d are positioned in different physical locations to provide spatial diversity. As shown in FIG. 6B, the antenna elements 602a-602d are controlled using a common signal feed 603. Thus, when the passive antenna array 610 is receiving, the signals are combined to form an aggregate or combined receive signal. Additionally, when the passive antenna array 610 is transmitting, a transmit signal received at the common signal feed 603 is split such that the transmit signal is radiated using each of the antenna elements 602a-602d.

Although shown with four antenna element in a 2×2 array, other numbers of antenna elements (for instance, larger arrays) and/or other arrangements of antenna elements are possible.

Figure 6C:
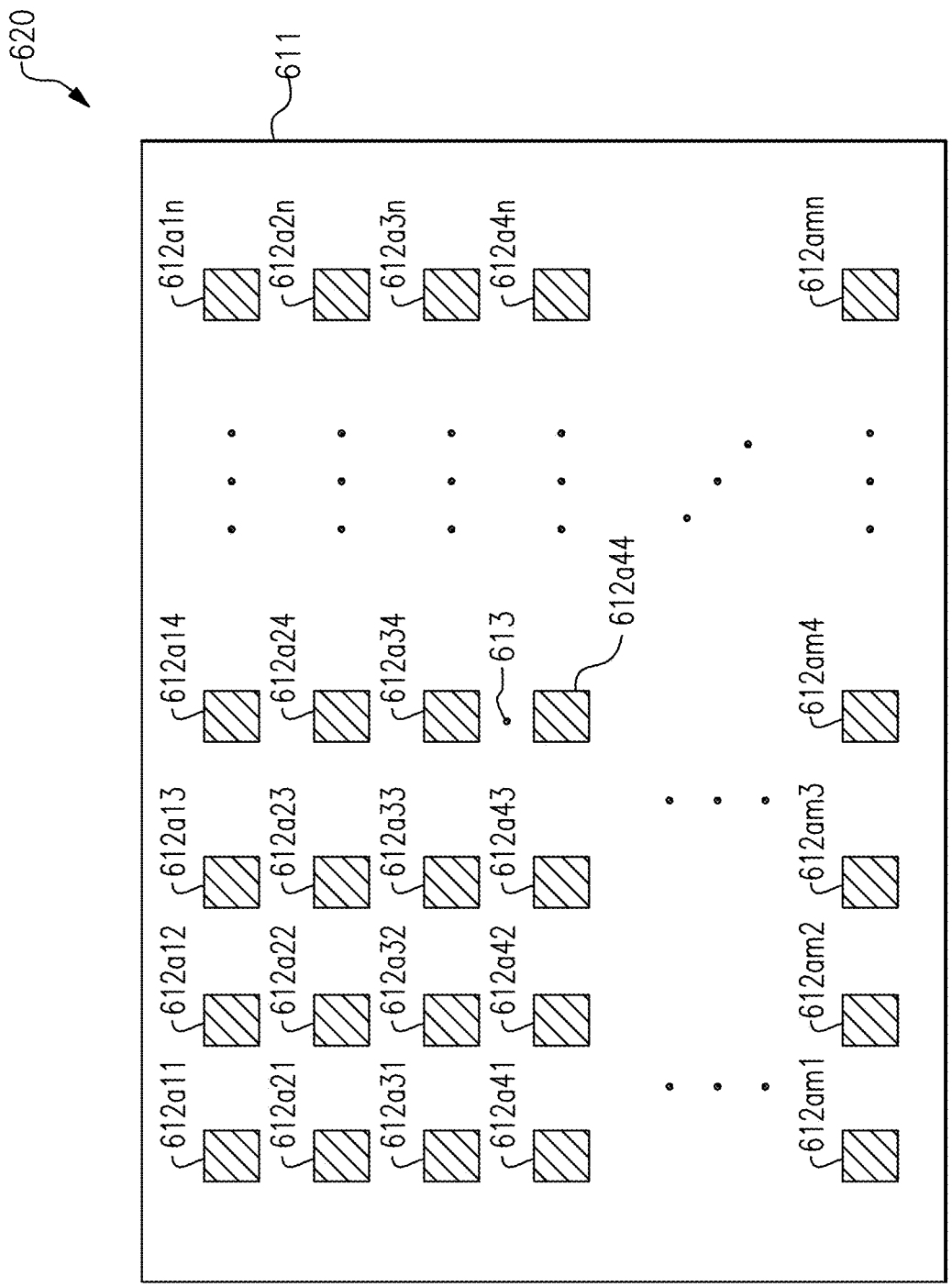
FIG. 6C is a diagram of an overhead or frontal view of another embodiment of a passive antenna array.

FIG. 6C is a diagram of an overhead or frontal view of another embodiment of a passive antenna array 620. The passive antenna array 620 is formed on a front side of a PCB 611, and includes an m×n array of patch antenna elements.

In particular, the patch antenna array includes a first row of n elements 612a11, 612a12, 612a13, 612a14, . . . 612a1n, a second row of n elements 612a21, 612a22, 612a23, 612a24, . . . 612a2n, a third row of n elements 612a31, 612a32, 612a33, 612a34, . . . 612a3n, a fourth row of n elements 612a41, 612a42, 612a43, 612a44, . . . 612a4n, and an mth row of n elements 612am1, 612am2, 612am3, 612am4, . . . 612amn.

As shown in FIG. 6C, the passive antenna array 620 includes m×n antenna elements, where m and n can be any desired integers (which can be the same or different as one another). The total number of antenna elements can any desired value selected for a particular application (for instance a desired antenna gain), for example, 4 or more antenna elements, 16 or more antenna elements, or 512 or more antenna elements. Although depicted as a rectangular array, the teachings herein are also applicable to other arrangements of passive antenna arrays, such as non-uniform arrangements of antenna elements.

In the illustrated embodiment, each of the patch antenna elements is formed of a metallic patch antenna element that is connected by via(s) and conductive routes to a common signal feed 613. In certain implementations, the common signal feed 613 is formed on a backside of the PCB 611 opposite the front side on which the antenna array is formed. In the illustrated embodiment, each patch antenna element is connected to the signal feed 613 without any intervening active circuitry, such as phase shifters and controllable amplifiers as in an active antenna array. The signal routes to the common signal feed 613 have lengths selected such that the signals combine constructive at a desired frequency of interest (for instance, 28 GHz or other desired signal frequency).

In certain implementations, the PCB 611 includes a first conductive layer on which the antenna array is formed, a second conductive layer (which can include, for example, the signal feed 613 and metal routes connecting each patch antenna element to the signal feed 613), and a dielectric layer poisoned between the first conductive layer and the second conductive layer. Additionally, vias are included through the dielectric layer to provide desired connections between the first conductive layer and the second conductive layer. Thus, the PCB 611 can include a metal-insulator-metal structure. In certain embodiments, the PCB 611 includes additional layers, for instance, three or more metal layers to enhance flexibility in providing routing and/or shielding between opposing sides of the PCB. For example, one or more ground planes can be included in the PCB for enhanced isolation (for instance, enhanced front-to-back isolation).

In one embodiment, a total size of the PCB 611 is less than 1 square inch to achieve compact size, for instance, integration on or in a housing of a signal booster. For example, when operating at FR2 frequency ranges of 5G communications, mmW frequencies, and/or other high signal frequencies, each antenna element of the array can be implemented with a relatively compact size, for instance, 100 mm$^2$ or less.

In certain implementations, a total number of antenna elements is selected to achieve a desired antenna gain. For example, to achieve a high signal gain (for instance, 27 dBi or more), a relatively large number of antenna elements (for instance, 128 or more) can selected, while fewer antenna elements can be chosen in applications in which a lower antenna gain is desired.

Figure 7:
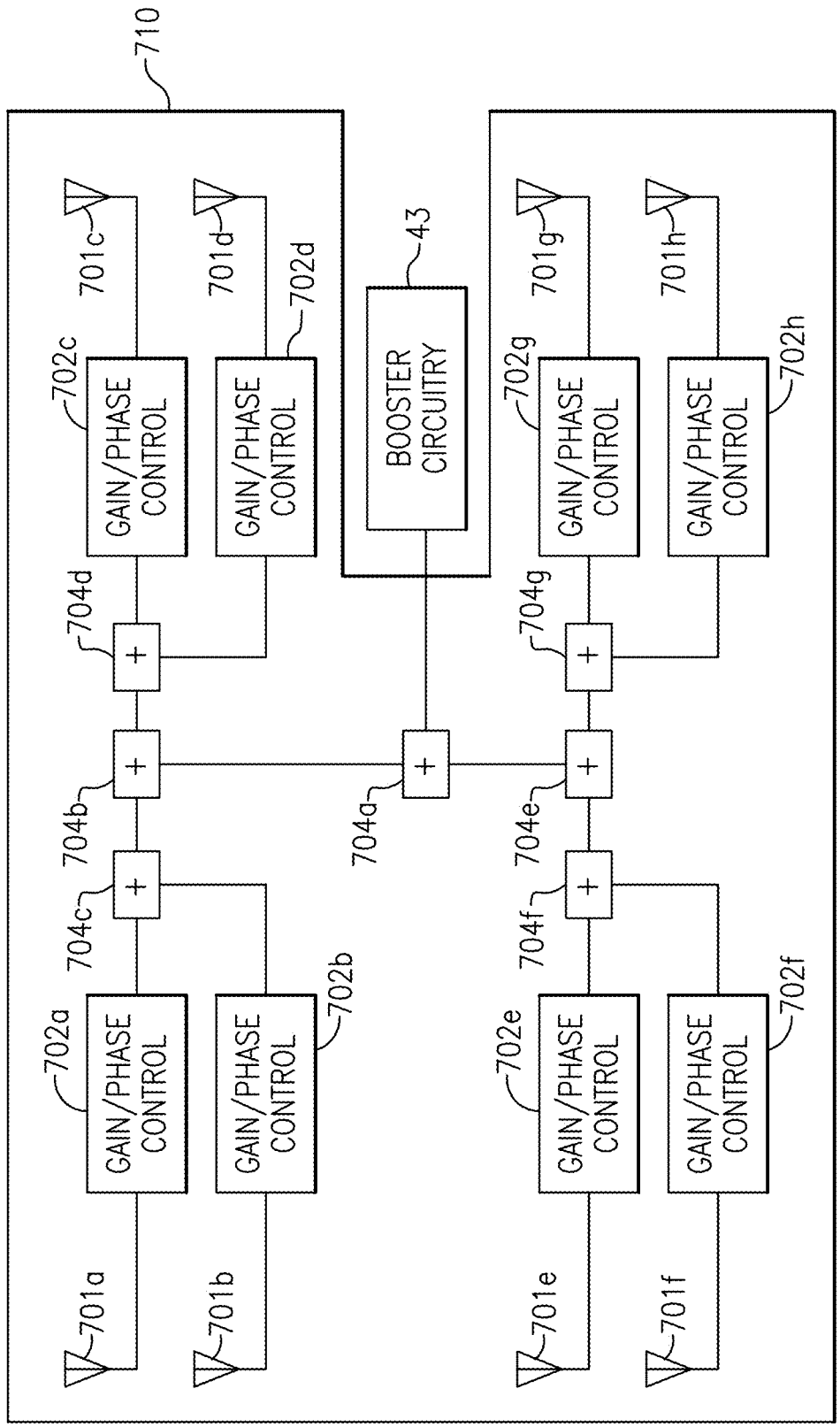
FIG. 7 is a schematic diagram of one embodiment of an active beamforming antenna array coupled to booster circuitry.

FIG. 7 is a schematic diagram of one embodiment of an active beamforming antenna array 710 coupled to booster circuitry 43.

In the illustrated embodiment, the active beamforming antenna array 710 includes first to eighth antenna elements 701a-701h, respectively, first to eighth gain/phase control circuits 702a-702h, respectively, and first to seventh combiners/splitters 704a-704g, respectively.

The active beamforming antenna array 710 illustrates one embodiment of an active beamforming antenna array for serving as a directional base station antenna. However, the teachings herein are applicable to base station antennas implemented in a wide variety of ways, including, but not limited to, using other configurations of active beamforming antenna arrays or other directional antennas.

Although shown as including an array of eight antenna elements, more or fewer antenna elements and corresponding signal processing circuitry can be included.

With reference to FIG. 7, beamforming of a transmit beam is accomplished by separately controlling the phase and magnitude of an RF transmit signal (for instance, an uplink signal for transmission) from the booster circuitry 43 using the gain/phase control circuits 702a-702h, thereby focusing RF energy in a particular direction. When beamforming a receive beam, the gain and phase of RF signals received by the antenna elements 702a-702h are controlled such that the aggregate receive signal (for instance, a downlink signal) provided to the booster circuitry 43 indicates electromagnetic energy received by the antenna array from a particular direction.

Accordingly, beamforming is applicable to both transmit and receive directions. Additionally, the combiners/splitters 704a-704g provide signal splitting when the antenna array is transmitting, and provide signal combining when the antenna array is receiving.

In certain implementations, the gain/phase control circuits 702a-702h are formed on a semiconductor die that includes a serial interface, such as an I$^2$C bus, that receives data for selecting a particular beam pattern (for instance, a transmit or receive beam of a particular angle and strength) for beamforming.

Such settings for beamforming can be controlled in a wide variety of ways. In certain implementations, a controller of the booster circuitry 43 (for instance, the controller 429 of FIG. 5) provides data for controlling beamforming. For instance, the controller can be formed on a first semiconductor die that is coupled to a second semiconductor die including the gain/phase control circuitry, and the controller can provide data for controlling beamforming over a serial interface connecting the dies. In certain implementations, software of the controller (for instance, software stored in a memory circuit of the controller 429 of FIG. 5) can control or determine settings for beamforming.

Accordingly, the controller of the booster circuitry 43 is used to manage beamforming in certain implementations.

In certain implementations, beamforming is used to angularly align beams transmitted and received from a directional base station antenna of a signal booster system with respect to an antenna of cellular infrastructure equipment, such as a base station. For example, beamforming can be used to correct for an installation error in pointing an active beamforming antenna array at another antenna.

Additionally or alternatively, beamforming can be used to regularly realign or calibrate a direction of beamforming to compensate for changes in the relative position and/or orientation between the active beamforming antenna array and another antenna. For instance, a signal booster system can be bumped or moved, which can lead to a change in antenna position and/or orientation over time.

Thus, beamforming can be used to align communications between a base station antenna of a signal booster system and an antenna of cellular infrastructure equipment, thereby enhancing the strength of the wireless communication link therebetween.

Such beamforming in the signal booster system can be separate or independent of any beamforming in the cellular protocol, such as beamforming information incorporated or built into 5G communications. For example, the signal booster system can be stationary absent occasional changes to antenna orientation and/or position, and thus need not track objects in real time. Accordingly, beamforming for a signal booster system need not decode the baseband signals to manage beamforming, but rather can provide beamforming that is additional to or supplements any underlying beamforming in the communication protocol. In another embodiment, a signal is processed in a 5G NR beamforming protocol layer to do active beamforming from the booster to the base station and from the booster to each mobile device. Accordingly, the teachings herein are also applicable to signal boosters that manipulate the lower layer protocol in an uplink direction and/or a downlink direction.

One example algorithm for beamforming in a signal booster system will now be provided. Such an algorithm can be performed by a controller of the signal booster system, such as by using a processor and memory of the controller 429 of FIG. 5, in combination with an active beamforming antenna array, such as the active beamforming antenna array 710 of FIG. 7.

In a first step of the example beamforming algorithm, the direction control for beamforming is set in a neutral setting (for instance, non-directional), and the received signal strength is characterized using one or more power detectors, which can be included in the active beamforming antenna array and/or in booster circuitry. For instance, a high speed power detector can be used to measure signal strength each time a time interval completes (for instance, every 10 microseconds over several seconds). For TDD communications, such measurements can occur during receive slots, with a flat portion of the measured data used to identify a pattern of signal levels.

In a second step of the example beamforming algorithm, the phase and gain associated with each antenna element is controlled to focus the beam to point in a particular direction within the angular range of the antenna array, and step one is performed to measure signal strength for this beam direction. The second step is repeated for multiple beam directions, thereby collecting signal strength data for multiple beam directions, such as beam directions spanning the full angular range of the antenna array.

In one example, the second step is performed by measuring signal strength when pointing the beam in an upper left portion of directional control allowed, and thereafter incrementally moving the beam direction right and measuring signal strength until the angular range of the antenna array can no longer be moved right and a horizontal slice of the angular range has been covered. A horizontal sweep can be repeated for each desired vertical beam setting, thus sweeping a desired portion of the area covered by the antenna array.

In a third step of the example beamforming algorithm, the beamforming setting with about the highest receive signal strength can be used. Such setting can be fixed or static until the next beam direction calibration is performed (if any).

In certain implementations, a coarse search is first performed by measuring signal strength for each of multiple coarse beam directions in the angular range of the antenna array. After the direction with about the highest signal strength is identified, a fine sweep can be performed for beam directions adjacent to or nearby the beam direction identified by the coarse sweep. Additionally, the direction with about the highest signal strength from the fine sweep can be used to as the selected beamforming setting.

Example of Loss and Isolation Calculations

This section provides one example of loss and isolation calculations pertaining to high frequency cellular networks and signal boosters.

Table 1 below provides calculations pertaining to isolation for a horizontal arrangement of a base station antenna and a mobile station antenna. The calculations are generated based on an isolation formula $Lh=22+20*lg(d/\lambda)-(Gt+Gr)+(Dt+Dr)$.

TABLE 1

| Frequency(MHz) | 28000 | 2100 | 700 |
|---|---|---|---|
| Wavelength(m) | 0.011 | 0.143 | 0.429 |
| Gain1(dB) | 10 | 7 | 4 |
| Front-to-rear ratio; 1(dB) | 17 | 12 | 6 |
| Gain2(dB) | 10 | 7 | 4 |
| Front-to-rear ratio; 2(dB) | 17 | 12 | 6 |
| Distance1 Feet | 64.94 | 38.44 | 22.90 |
| Distance2 Feet | 70.96 | 44.46 | 28.92 |
| Distance3 Feet | 74.49 | 47.99 | 32.44 |
| Distance2M | 81.42 | 54.92 | 39.38 |

Table 2 below provides calculations pertaining to isolation for a vertical arrangement of a base station antenna and a mobile station antenna. The calculations are generated based on an isolation formula Lv=28+40*lg(d/λ)−(Gt+Gr)+(Dt+Dr).

TABLE 2

| Frequency(MHz) | 28000 | 2100 | 700 |
|---|---|---|---|
| Wavelength(m) | 0.011 | 0.143 | 0.429 |
| Gain1(dB) | 10 | 7 | 4 |
| Front-to-rear ratio; 1(dB) | 17 | 12 | 6 |
| Gain2(dB) | 10 | 7 | 4 |
| Front-to-rear ratio; 2(dB) | 17 | 12 | 6 |
| Distance1 Feet | 85.89 | 40.89 | 21.80 |
| Distance2 Feet | 97.93 | 52.93 | 33.85 |
| Distance3 Feet | 104.97 | 59.97 | 40.89 |
| Distance2M | 118.84 | 73.85 | 54.76 |

Table 3 below provides calculations pertaining to isolation at 45 degrees in which horizontal and vertical displacements of a base station antenna and a mobile station antenna are equal. The calculations are generated based on an isolation formula Ls=(Lv−Lh)(α/90)+Lh.

TABLE 3

| Frequency(MHz) | 28000 | 2100 | 700 |
|---|---|---|---|
| Distance1 Feet | 75.415 | 39.667 | 22.353 |
| Distance2 Feet | 84.446 | 48.697 | 31.384 |
| Distance3 Feet | 89.728 | 53.980 | 36.667 |
| Distance2M | 100.132 | 64.384 | 47.070 |

Table 4 below provides calculations pertaining to free space propagation path loss. The calculations are generated based on a path loss model 20 Lgf+20 LgD−27.55 dB.

TABLE 4

| Frequency(MHz) | D(m) | Constant(dB) | Path Loss(dB) |
|---|---|---|---|
| 28000 | 100 | 27.56 | 101.4 |
| 2100 | 100 | 27.56 | 78.9 |
| 700 | 100 | 27.56 | 69.3 |

Table 5 below provides FCC test report reference values of antenna gain and EIRP for different entities.

TABLE 5

| Entity | Antenna Gain(dBi) | Single Antenna EIRP (dBm) |
|---|---|---|
| Samsung | 25 | 48 |
| Ericsson | 24 | 46 |
| Nokia | 29 | 57 |
| Samsung CPE | 19 | 35~39 |

Table 6 below provides calculations pertaining to a Hata model Lb=69.55+26.16 lgf−13.82 lghb−α(hm)+(44.9−6.55 lgh)lgd. For example, Lb corresponds to median smooth terrain radio wave propagation loss in urban areas, measured in decibels (dB). Additionally, hb corresponds to base station antenna effective height (measured in meters), while hm corresponds to mobile station effective antenna height (measured in meters). Furthermore, d corresponds to the distance between mobile station and base station (measured in kilometers), and α(hm) to mobile station antenna height factor. At frequencies less than or equal to 300 MHz, α(hm)=8.29 [lg(1.54 hm)]2−1.1 dB, while at frequencies greater than 300 MHz, α(hm)=3.2[lg(11.75 hm)]2−4.97 dB. With respect to a big city operating environment, hm=1.5 m, α(hm)=0, while for medium and small cities hm=(1.56 lgf−0.8) and α(hm)=(1.1 lgf−0.7). Furthermore, for suburbs Lbs=Lb (Urban area)−2[lg(f/28)]2−5.4.

TABLE 6

| f(MHz) | hb(m) | hm(m) | d(km) | α(hm) big city | α(hm) med/small city | Lb big city | Lb med/small city | suburbs |
|---|---|---|---|---|---|---|---|---|
| 28000 | 20.00 | 1.50 | 0.10 | 0.00 | 0.15 | 131.53 | 131.38 | 108.13 |
| 28000 | 20.00 | 1.50 | 0.05 | 0.00 | 0.15 | 120.58 | 120.43 | 97.18 |
| 28000 | 20.00 | 1.50 | 0.025 | 0.00 | 0.15 | 109.63 | 109.48 | 86.23 |
| 700 | 20.00 | 1.50 | 0.10 | 0.00 | 0.01 | 89.62 | 89.61 | 80.31 |

Table 7 below provides calculations pertaining to big city results for a Hata model Lb=69.55+26.16 lgf−13.82 lghb−α(hm)+(44.9−6.55 lghb)lgd.

TABLE 7

| f(GHz) | BS EIRP (dBm) | d(m) BS to booster | donor receive signal strength | donor ANT gain (dBi) | booster gain (dB) | output power (dBm) | retransmit ANT gain (dBi) | EIRP (dBm) |
|---|---|---|---|---|---|---|---|---|
| 28(E1) | 48.00 | 50.00 | −72.58 | 10.00 | 100.00 | 37.42 | 10.00 | 47.42 |
| 28(E2) | 48.00 | 100.00 | −83.53 | 10.00 | 110.00 | 36.47 | 10.00 | 46.47 |
| 28(E3) | 48.00 | 25.00 | −61.63 | 10.00 | 90.00 | 38.37 | 10.00 | 48.37 |

Table 8 below provides calculations relating to a number of small base stations deployed. The calculations are based on data from the preceding tables.

TABLE 8

| long (m) | width (m) | coverage area (square km) | # of small base stations | # of small base stations per square km |
|---|---|---|---|---|
| 500 | 500 | 0.25 | 100 | 400 |
| 500 | 500 | 0.25 | 25 | 100 |
| 500 | 500 | 0.25 | 400 | 1600 |
| 500 | 500 | 0.25 | 100 | 400 |

Although one example of loss and isolation calculations have been provided in this section, calculation results can vary based on a wide variety of factors, such as models and/or parameters. Accordingly, other results are possible.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not only the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A signal booster system for a high frequency cellular network, the signal booster system comprising:
    a base station antenna configured to receive a downlink signal and to transmit an amplified uplink signal, wherein the base station antenna is directional;
    booster circuitry configured to amplify an uplink signal to generate the amplified uplink signal, and to amplify the downlink signal to generate an amplified downlink signal; and
    a mobile station antenna configured to receive the uplink signal and to transmit the amplified downlink signal, wherein the booster circuitry includes a downlink amplification circuit configured to boost two or more frequency channels of a frequency band without channelization of the two or more frequency channels.

2. The signal booster system of claim 1, wherein the downlink amplification circuit includes at least one bandpass filter and at least one amplifier connected along a signal path, the at least one bandpass filter operable to pass a frequency range including the two or more frequency channels.

3. The signal booster system of claim 2, wherein the frequency range covers at least 400 MHz.

4. The signal booster system of claim 2, wherein the frequency range covers all of the frequency band.

5. The signal booster system of claim 1, wherein the frequency band is higher than 20 GHz.

6. The signal booster system of claim 1, wherein the frequency band is a fifth generation (5G) frequency band.

7. The signal booster system of claim 6, wherein the frequency band is one of n261, n257, 258, or n260.

8. The signal booster system of claim 1, wherein the booster circuitry further includes an uplink amplification circuit configured to boost the two or more frequency channels of the frequency band without channelization.

9. The signal booster system of claim 1, installed in a cellular network, wherein the two or more frequency channels include a first frequency channel locally operated by a first cellular carrier and a second frequency channel locally operated by a second cellular carrier.

10. The signal booster system of claim 1, wherein the mobile station antenna comprises a sector antenna.

11. The signal booster system of claim 1, wherein the base station antenna has a directionality of at least 12 dBi.

12. The signal booster system of claim 1, wherein the base station antenna comprises a parabolic antenna.

13. The signal booster system of claim 1, further comprising a housing including the booster circuitry therein, and a first cable connecting the base station antenna to the booster circuitry.

14. The signal booster system of claim 13, wherein the first cable has a length of 5 feet or less.

15. The signal booster system of claim 13, further comprising a second cable connecting the mobile station antenna to the booster circuitry.

16. The signal booster system of claim 15, wherein the second cable has a length of 5 feet or less.

17. The signal booster system of claim 15, installed in a cellular network, wherein the base station antenna and the mobile station antenna are vertically displaced by an offset.

18. The signal booster system of claim 17, wherein the offset is between 1 meter and 3 meters.

19. The signal booster system of claim 17, wherein the offset is less than 1 meter.

20. The signal booster system of claim 1, wherein the booster circuitry is configured to operate at least in part using time division duplexing (TDD), the booster circuitry further including an uplink amplification circuit configured to amplify the uplink signal, a first TDD switch configured to selectively connect the base station antenna to an input of the downlink amplification circuit or to an output of the uplink amplification circuit, and a second TDD switch configured to selectively connect the mobile station antenna to an output of the downlink amplification circuit or to an input of the uplink amplification circuit.

\* \* \* \* \*